(12) United States Patent
Huotari

(10) Patent No.: US 7,864,899 B2
(45) Date of Patent: Jan. 4, 2011

(54) SYNCHRONIZATION

(75) Inventor: Arto Huotari, Oulu (FI)

(73) Assignee: Nokia Corporation, Espoo (FI)

( * ) Notice: Subject to any disclaimer, the term of this patent is extended or adjusted under 35 U.S.C. 154(b) by 635 days.

(21) Appl. No.: 11/808,371

(22) Filed: Jun. 8, 2007

(65) Prior Publication Data
US 2008/0049881 A1  Feb. 28, 2008

(30) Foreign Application Priority Data
Aug. 28, 2006  (FI) .................................. 20065534

(51) Int. Cl.
*H03D 1/00* (2006.01)
(52) U.S. Cl. ...................... 375/343; 375/340; 375/316; 375/320; 375/335; 375/342
(58) Field of Classification Search ................. 375/343, 375/340, 316
See application file for complete search history.

(56) References Cited

U.S. PATENT DOCUMENTS

| | | | | |
|---|---|---|---|---|
| 5,661,764 | A | * | 8/1997 | Nakajima .................... 375/368 |
| 5,787,128 | A | | 7/1998 | Honkisz |
| 5,809,009 | A | | 9/1998 | Matsuoka et al. |
| 5,852,630 | A | * | 12/1998 | Langberg et al. ............. 375/219 |
| 5,933,465 | A | * | 8/1999 | Ozaki ......................... 375/346 |
| 6,038,270 | A | * | 3/2000 | Watanabe et al. ............ 375/343 |
| 7,154,975 | B1 | * | 12/2006 | Bohnke et al. .............. 375/368 |
| 2004/0132457 | A1 | * | 7/2004 | Sanders et al. .............. 455/450 |
| 2007/0161385 | A1 | * | 7/2007 | Anderson ................... 455/502 |

FOREIGN PATENT DOCUMENTS

| | | |
|---|---|---|
| EP | 0318686 | 6/1989 |
| EP | 0551803 | 7/1993 |
| EP | 0751644 | 1/1997 |
| EP | 0788263 | 8/1997 |
| EP | 1032157 | 8/2000 |
| EP | 1311077 | 6/2005 |

* cited by examiner

*Primary Examiner*—Kenneth Lam
(74) *Attorney, Agent, or Firm*—Squire, Sanders & Dempsey L.L.P.

(57) ABSTRACT

A method and an apparatus are provided, the apparatus includes a correlator configured to correlate samples of a frame format signal with a reference signal; an adder block configured to sum the correlation results over a given time period; a comparator configured to compare the sum with a given reference value; a controller configured, if the sum exceeds the reference value, to make the decision that a frequency correction channel has been detected, store the position of the frequency correction channel in the frame format signal and cease the correlation process; and otherwise configured to control the correlation and comparison to continue until the time reserved for the correlation process ends, to retain the value in the adder block; and to control the apparatus to resume the above process when a new time reserved for the correlation process is due.

13 Claims, 3 Drawing Sheets

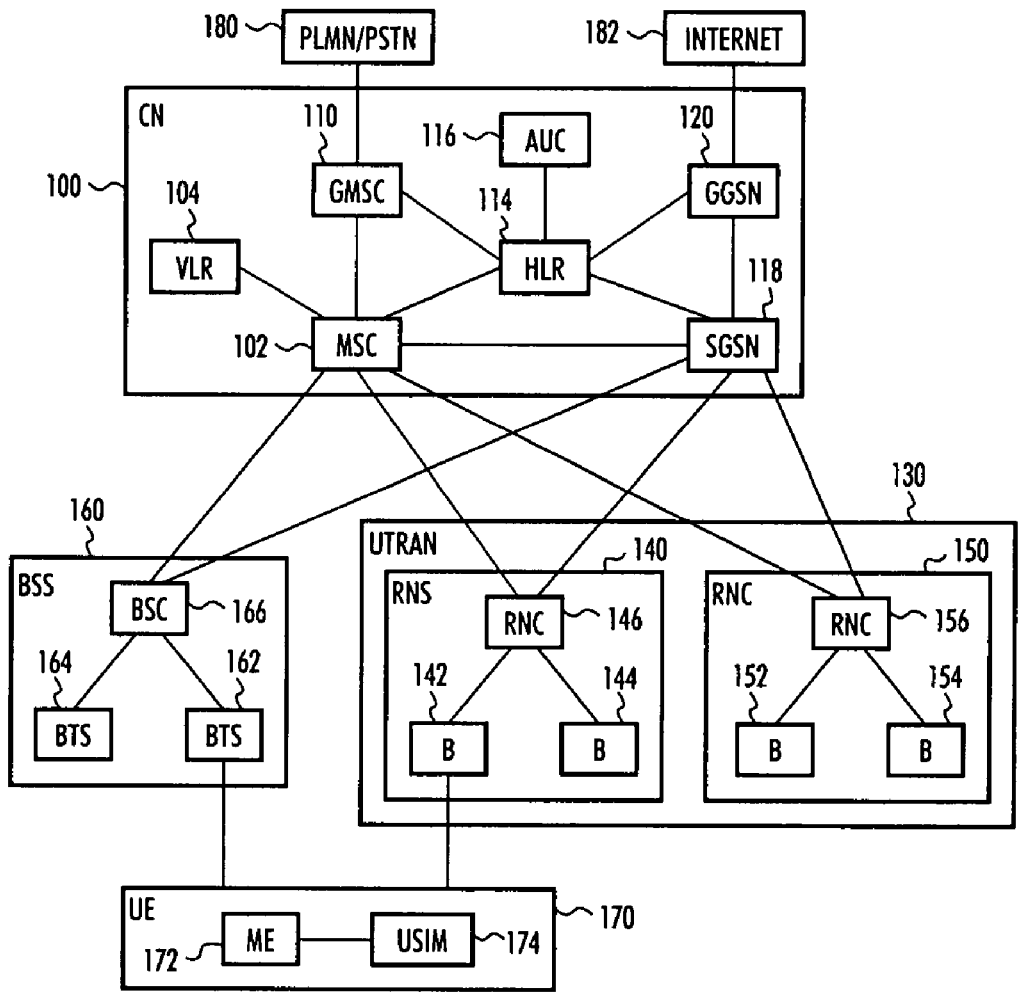
Fig. 1
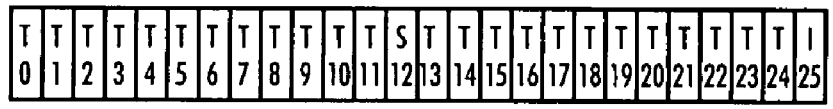
Fig. 2
Fig. 3

SYNCHRONIZATION

FIELD

The invention relates to synchronization in telecommunication systems.

BACKGROUND

In digital communication networks, mobile units must obtain information about the network and the serving base station before communication with the base station is possible. This process is often performed in three steps. The mobile unit must synchronize itself with the base station both in frequency and in time. Finally, the mobile unit obtains base station data from the signal transmitted by the base station.

In many communication systems, a mobile unit performs similar operations for handover purposes even when having a contact with a base station. A mobile unit may scan frequencies for signals of nearby base stations and store obtained information in case a handover must be performed quickly.

In many communication systems, the need for measurements has been taken into account in the air interface structure. The frame structure may provide the mobile units with time periods where different measurements may be performed.

In systems based on GSM (Global System for Mobile communication), the air interface structure is based on frames. Frames used to transmit traffic data comprise 8 time slots. Frames are organized as multiframes comprising 26 successive frames. Of these 26 frames, all other frames are used in transmitting traffic channels but the thirteenth frame, which is reserved for slow associated control channel, and the last frame, which is an idle frame. In the last frame, nothing is transmitted. Thus, a mobile unit may perform measurements during the last frame. The mobile unit may measure the signal strengths of neighboring base stations or search for new base stations.

In GSM based systems, the base stations transmit a frequency correaction channel (FCCH) so that a mobile unit may synchronize itself with the base station. The FCCH is transmitted on one frequency using a multiframe comprising 51 frames. The FCCH is transmitted in the first time slot of a frame five times during these 51 multiframes. Other control data is transmitted in the rest of the frames of the multiframe.

Typically, a mobile unit uses the following scheduling when searching for an FCCH. First, 0.5 time slots is required for switching from the current TX/RX frequency to the frequency where FCCH search is performed. One time slot is required for filling an FCCH correlator buffer, which is needed in order to obtain correct results when correlations are calculated. Eight time slots are spent for searching the FCCH. The search is performed by receiving a signal on the given frequency and correlating the signal with a known FCCH signal pattern. If a high correlation value is detected, it is likely that an FCCH has been found. Finally, 0.5 time slots are required for switching from the FCCH frequency to the current TX/RX frequency. Thus, the complete operation takes 10 time slots.

In most situations, the mobile units are able to perform the above operation without any problems. In normal operation, a mobile unit is transmitting and receiving on one time slot in both transmission directions (uplink and downlink). However, to support enhanced data communication with high bit rates, new multislot traffic classes have been proposed. In multislot operation, a mobile unit may utilize several time slots in a frame. For example, a mobile unit could receive using 7 time slots or the sum of time slots reserved for reception and transmission could be 6. These kind of multislot configurations may be utilized in packet switched data traffic or dual transfer mode situations where a mobile unit simultaneously has a circuit switched and a packet switched connection active.

A mobile unit having a high multislot connection is not able to perform the above described FCCH search during the idle frame. In a high multislot connection, the mobile unit may have a transmit or a receive time slot as the $7^{th}$ slot of the frame. Thus, combined with the idle frame, the mobile unit may have only 9 time slots free for measurement purposes.

To circumvent the above problem, the current specifications allow a mobile unit to skip one RX or TX time slot in order to perform a full FCCH search. However, as other network elements are not aware when a mobile unit skips a time slot, the present method leads to a high number of retransmissions and reduced data throughput.

BRIEF DESCRIPTION OF THE INVENTION

An object of the invention is to provide an improved solution for synchronization. According to an aspect of the invention, there is provided a method in user equipment, comprising: communicating in one or more allocated time slots at a given frequency with a first base station, the first base station transmitting a frame format signal comprising idle frames; tuning to a frequency at which a second base station with which the user equipment does not have connection is transmitting a signal, when the last allocated time slot before an idle frame has elapsed; receiving a frame format signal transmitted by the second base station; correlating the received signal with a reference signal; summing the correlation results over a given time period in an adder block; comparing the sum with a given reference value and, if the sum exceeds the reference value, making the decision that a frequency correction channel has been detected, storing the position of the frequency correction channel in the frame format signal and exiting the process; otherwise; continuing correlation and comparison until the idle frame ends; retaining the value in the adder block; tuning back to the frequency used by the first base station; and continuing the above process in every other idle frame.

According to another aspect of the invention, there is provided user equipment, comprising: a receiver configured to communicate in one or more allocated time slots at a given frequency with a first base station, the first base station transmitting a frame format signal comprising idle frames; a radio frequency unit configured to tune to a frequency at which a second base station with which the user equipment does not have connection is transmitting a signal, when the last allocated time slot before an idle frame has elapsed; a sampler configured to sample a frame format signal transmitted by the second base station; a correlator configured to correlate the samples with a reference signal; an adder block configured to sum the correlation results over a given time period; a comparator configured to compare the sum with a given reference value; a controller configured, if the sum exceeds the reference value, to make the decision that a frequency correction channel has been detected, store the position of the frequency correction channel in the frame format signal and cease the correlation process; and otherwise configured to control the correlation and comparison to continue until the idle frame ends, to retain the value in the adder block; to control the radio frequency unit to tune back to the frequency used by the first base station; and control the user equipment to continue the above process in every other idle frame.

According to another aspect of the invention, there is provided an apparatus, comprising: a correlator configured to correlate samples of a frame format signal with a reference signal; an adder block configured to sum the correlation results over a given time period; a comparator configured to compare the sum with a given reference value; a controller configured, if the sum exceeds the reference value, to make the decision that a frequency correction channel has been detected, store the position of the frequency correction channel in the frame format signal and cease the correlation process; and otherwise configured to control the correlation and comparison to continue until the time reserved for the correlation process ends, to retain the value in the adder block; and to control the apparatus to resume the above process when a new time reserved for the correlation process is due.

According to another aspect of the invention, there is provided a method, comprising: receiving a sampled frame format signal; correlating the sampled signal with a reference signal; summing the correlation results over a given time period in an adder block; comparing the sum with a given reference value and, if the sum exceeds the reference value, making the decision that a frequency correction channel has been detected and storing the position of the frequency correction channel in the frame format signal and exiting the process; otherwise; continuing correlation and comparison until the time reserved for the correlation process ends; retaining the value in the adder block; and continuing the above process when a new time reserved for the correlation process is due.

According to another aspect of the invention, there is provided user equipment, comprising: means for communicating in one or more allocated time slots at a given frequency with a first base station, the first base station transmitting a frame format signal comprising idle frames; means for tuning to a frequency at which a second base station with which the user equipment does not have connection is transmitting a signal, when the last allocated time slot before an idle frame has elapsed; means for sampling a frame format signal transmitted by the second base station; means for correlating the samples with a reference signal; adding means for summing the correlation results over a given time period; means for comparing the sum with a given reference value; controlling means for, if the sum exceeds the reference value, making the decision that a frequency correction channel has been detected, storing the position of the frequency correction channel in the frame format signal and ceasing the correlation process; and otherwise for controlling the correlation and comparison to continue until the idle frame ends, retaining the value in the adder block; for controlling the radio frequency unit to tune back to the frequency used by the first base station; and controlling the user equipment to continue the above process in every other idle frame.

According to yet another aspect of the invention, there is provided a computer program distribution medium readable by a computer and encoding a computer program of instructions for executing a computer process for detecting a frequency correction channel, the process comprising: communicating in one or more allocated time slots at a given frequency with a first base station, the first base station transmitting a frame format signal comprising idle frames; tuning to a frequency at which a second base station with which the user equipment does not have connection is transmitting a signal, when the last allocated time slot before an idle frame has elapsed; receiving a frame format signal transmitted by the second base station; correlating the received signal with a reference signal; summing the correlation results over a given time period in an adder block; comparing the sum with a given reference value and, if the sum exceeds the reference value, making the decision that a frequency correction channel has been detected, storing the position of the frequency correction channel in the frame format signal and exiting the process; otherwise; continuing correlation and comparison until the idle frame ends; retaining the value in the adder block; tuning back to the frequency used by the first base station; and continuing the above process in every other idle frame.

The invention provides several advantages. There is no need to skip any RX or TX time slots during FCCH search. Thus, data throughput in high multislot connections is improved. In addition, the power consumption is lower due to the shorter search time.

LIST OF DRAWINGS

In the following, the invention will be described in greater detail with reference to the embodiments and the accompanying drawings, in which FIG. 1 is a simplified block diagram showing the structure of a radio system;

FIG. 2 illustrates the frame structure of a typical carrier used to transmit user data;

FIG. 3 illustrates an example of a possible signalling frame structure used to transfer control information;

DESCRIPTION OF EMBODIMENTS

Figure 4:
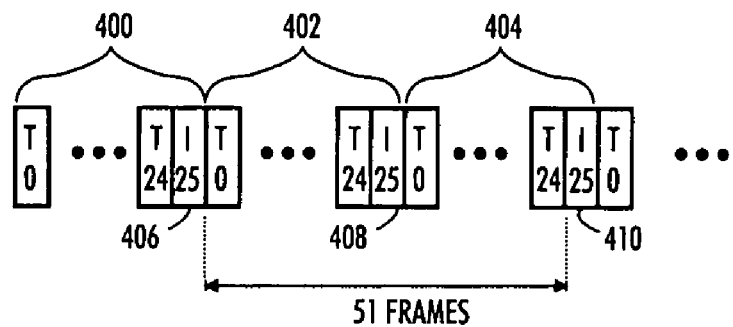
FIG. 4 illustrates an embodiment of FCCH measurement.

Let us take a closer look at FIG. 1, which illustrates the structure of a GSM based radio system. FIG. 1 is a simplified block diagram describing the most important radio system parts at network element level and the interfaces between them. The structure and operation of the network elements are not described in detail, since they are commonly known.

In FIG. 1, a core network CN 100 describes the radio access technology in a telecommunication system. A first radio system, i.e. a radio access network 130, and a second radio system, i.e. a base station system BSS 160, describe the radio systems. In addition, the Figure shows user equipment UE 170. The term UTRAN refers to the UMTS Terrestrial Radio Access Network, meaning that the radio access network 130 is implemented using Wideband Code Multiple Access WCDMA. The base station system 160 is implemented using Time Division Multiple Access TDMA.

In general, such a definition may also be presented that the radio system is formed of a subscriber terminal known for instance also by such terms as user equipment and mobile station, and a network part including a fixed infrastructure of the radio system, such as a radio access network or a base station system.

The structure of the core network 100 corresponds with the structure of the combined GSM and GPRS systems. GSM network elements are responsible for implementing circuit-switched connections, and GPRS network elements for implementing packet-switched connections, although some of the network elements are included in both systems.

A Mobile Services Switching Centre MSC 102 is the centre of the circuit-switched side of the core network 100. The same mobile services switching centre 102 can be used to serve the connections of both the radio access network 130 and the base station system 160. The functions of the mobile services switching centre 102 include: switching, paging, location registration of user equipment, handover management, collecting subscriber billing information, encryption parameter management, frequency allocation management and echo cancellation. The number of mobile services switching centres 102 may vary: a small network operator may be provided with a single mobile services switching centre 102, but larger core networks 100 may be provided with several.

Larger core networks 100 may comprise a separate Gateway Mobile Services Switching Centre GMSC 110 handling the circuit-switched connections between the core network 100 and external networks 180. The gateway mobile services switching centre 110 is located between the mobile services switching centres 102 and external networks 180. The external network 180 may for instance be a Public Land Mobile Network PLMN or a Public Switched Telephone Network PSTN.

A Home Location Register HLR 114 includes a fixed subscriber register, or for instance the following information: an International Mobile Subscriber Identity, IMSI, a Mobile Subscriber ISDN Number, MSISDN, an Authentication Key and a PDP address (PDP=Packet Data Protocol) when the radio system supports the GPRS.

A Visitor Location Register VLR 104 includes information concerning roaming on the mobile unit or user equipment 170 within the area of the mobile services switching centre 102. The visitor location register 104 includes largely the same information as the home location register 114, but in the visitor location register 104, the information is placed only temporarily.

An Authentication Centre AuC 116 is physically always located at the same location as the home location register 114, and includes an Individual Subscriber Authentication Key Ki, Ciphering Key CK and a corresponding IMSI.

The network elements to be described in FIG. 1 are operational entities, and the physical implementation thereof may vary. Generally, the mobile services switching centre 102 and the visitor location register 104 form together a single physical apparatus, and the home location register 114 and the authentication centre 116 another physical apparatus.

A Serving GPRS Support Node SGSN 118 is the centre of the packet-switched side of the core network 100. The main task of the serving GPRS support node 118 is to transmit and receive packets with the user equipment 170 supporting packet-switched transmission using the radio access network 130 or the base station system 160. The serving GPRS support node 118 includes subscriber data and location information concerning the user equipment 170.

A Gateway GPRS Support Node GGSN 120 is the corresponding part on the packet-switched side to the gateway MSC 110 on the circuit-switched side, except that the gateway GPRS support node 120 must be able to route the outgoing traffic from the core network 100 to external networks 182, whereas the gateway MSC 110 only routes the incoming traffic. In this example, the Internet represents the external networks 182.

The first radio system, i.e. the radio access network 130, is formed of a radio network subsystem RNS 140, 150. Each radio network subsystem 140, 150 is formed of radio network controllers RNC 146, 156 and of nodes B 142, 144, 152, 154. Node B is a fairly abstract concept and the term often used instead is a base station.

The network controller 146 controls nodes B 142, 144 in its domain. In principle, the idea is to place the apparatuses implementing the radio path and the operations associated therewith into nodes B 142, 144 and the control equipment into the radio network controller 146.

The radio network controller 146 handles the following operations: radio resource management of nodes B 142, 144, inter-cell handover, frequency management, or allocation of frequencies to nodes B 142, 144, management of frequency hopping sequences, measurement of time delays in the uplink direction, operation and maintenance, and power control management.

Node B 142, 144 comprises one or more transceivers implementing the WCDMA radio interface. Typically, node B serves one cell, but such a solution is also possible in which node B serves several sectorized cells. The diameter of the cell may vary from a few meters to dozens of kilometres. Node B 142, 144 has the following functions: calculation of timing advance (TA), measurements in the uplink direction, encryption, decryption and frequency hopping.

The second radio system, or base station system, 160 is composed of a Base Station Controller BSC 166 and Base Transceiver Stations BTS 162, 164. The base station controller 166 controls the base transceiver station 162, 164. In principle, the aim is to place the equipment implementing the radio path and the functions associated therewith in the base station 162, 164 and to place the control equipment in the base station controller 166. The base station controller 166 handles substantially the same functions as the radio network controller.

The base transceiver station 162, 164 includes at least one transceiver implementing a carrier, or eight time slots, or eight physical channels. Typically, one base station 162, 164 serves one cell, but such a solution is also possible in which one base station 162, 164 serves several sectorized cells. The base station 162, 164 is considered to also include a transcoder, which carries out the conversion between the speech-coding modes used in the radio system and the speech-coding mode used in the public switched telephone network. However, in practice the transcoder is typically physically placed in the mobile services switching centre 102. The base transceiver stations 162, 164 are provided with corresponding functions as node B.

The mobile unit or user equipment 170 is composed of two parts: mobile equipment ME 172 and a UMTS Subscriber Identity Module, USIM 174. The user equipment 170 includes at least one transceiver that implements the radio connection to the radio access network 130 or to the base station system 160. The user equipment 170 comprises at least two different subscriber identity modules. In addition, the mobile unit 170 comprises an antenna, user equipment and a battery. Many kinds of user equipment 170 currently exist, for instance vehicle-mounted and portable terminals.

The USIM 174 includes information associated with the user, and in particular information associated with information security, for instance a cryptographic algorithm.

FIG. 2 illustrates the frame structure of a typical carrier used to transmit user data. The frame structure corresponds to the frame structure used in a GSM based system. The frame structure comprises a multiframe consisting of 26 successive frames. The first 12 frames (numbered from 0 to 11) are used for traffic channels. Each frame comprises 8 time slots. The $13^{th}$ frame is used for transmitting a slow associated control channel (SACCH). The SACCH is a control channel which is associated with a given traffic channel. The next 12 frames are again reserved for traffic channels and the last frame (frame 25) is an idle frame. In the idle frame, nothing is transmitted. In GSM, the length of the multiframe is 120 ms. The idle frame is designed to enable the mobile units to perform for example measurements.

FIG. 3 illustrates an example of a possible signalling frame structure used to transfer control information. The frame structure comprises 51 frames. The channels included in the frame are frequency correction channel FCCH (marked with F in the Figure), synchronization channel SCH (marked with S in the Figure), broadcast control channel BCCH and common control channel CCCH. In addition, the last frame is an idle frame. The channel combination is transmitted on a single frequency in a cell, in time slot 0. The frequency on which these channels are transmitted defines the cell to mobile units searching for the cell. Therefore the channels are not transmitted on more than one frequency.

As FIG. 3 illustrates, an FCCH slot is transmitted 5 times during the 51-multiframe structure. The FCCH slots are organized so that their interval is 10 frames, except that once during 51 frames a period equals 11 frames. Thus, the user equipment scanning the frequency must perform scanning a given time before an FCCH is detected. The traditional way to perform FCCH search is to apply it to a group of idle frames. Generally, the user equipment needs 12 consecutive idle frames in order to be sure that one of them contains an FCCH slot.

In an embodiment of the invention, the FCCH search time can be shortened by one time slot. Thus, skipping of RX/TX time slots adjacent to the idle frame may be avoided. This is possible by modifying the handling of correlation buffer. In an embodiment of the invention, filling of the correlation buffer at the beginning of the FCCH search may be avoided and thus the time previously used for filling the buffer (one time slot) may be used for searching.

As FIG. 2 illustrates, for user equipment having a packet data or dual transfer mode connection, every 26th frame is an idle frame. The user equipment, which performed an FCCH search in the idle frame n, is also able to carry out an FCCH search in frame n+52, because that is also an idle frame. If the length of an FCCH search equals 8 timeslots, the time interval from the end of an FCCH search in the frame n to the start of an FCCH search in the frame n+52 equals 51 frames. That time is equal to the length of a 51-multiframe. Thus, the user equipment may continue measuring the frequency at which the FCCH is sent in frame n+52 from the same frame position the search closed in frame n. Thus, if there were an FCCH transmission ongoing when the user equipment closed FCCH search in frame n, there is also an FCCH transmission ongoing when the user equipment starts the FCCH search in frame n+52.

In addition, the transmission in frame n+52 also continues from the symbol that is the next one after the last symbol that the user equipment was able to receive in the frame n. This is ensured by the fact that the length of the 51-multiframe is less than 0.25 seconds, which is so small that a significant drift may mot occur between the internal clock of the base station sending the FCCH and the internal clock of the measuring user equipment.

As the FCCH search may continue from the same place in the FCCH frame without any gaps in received symbols, there is no need to empty correlation buffers in between. Therefore the search may start immediately at the beginning of an idle frame measurement period.

Figure 5:
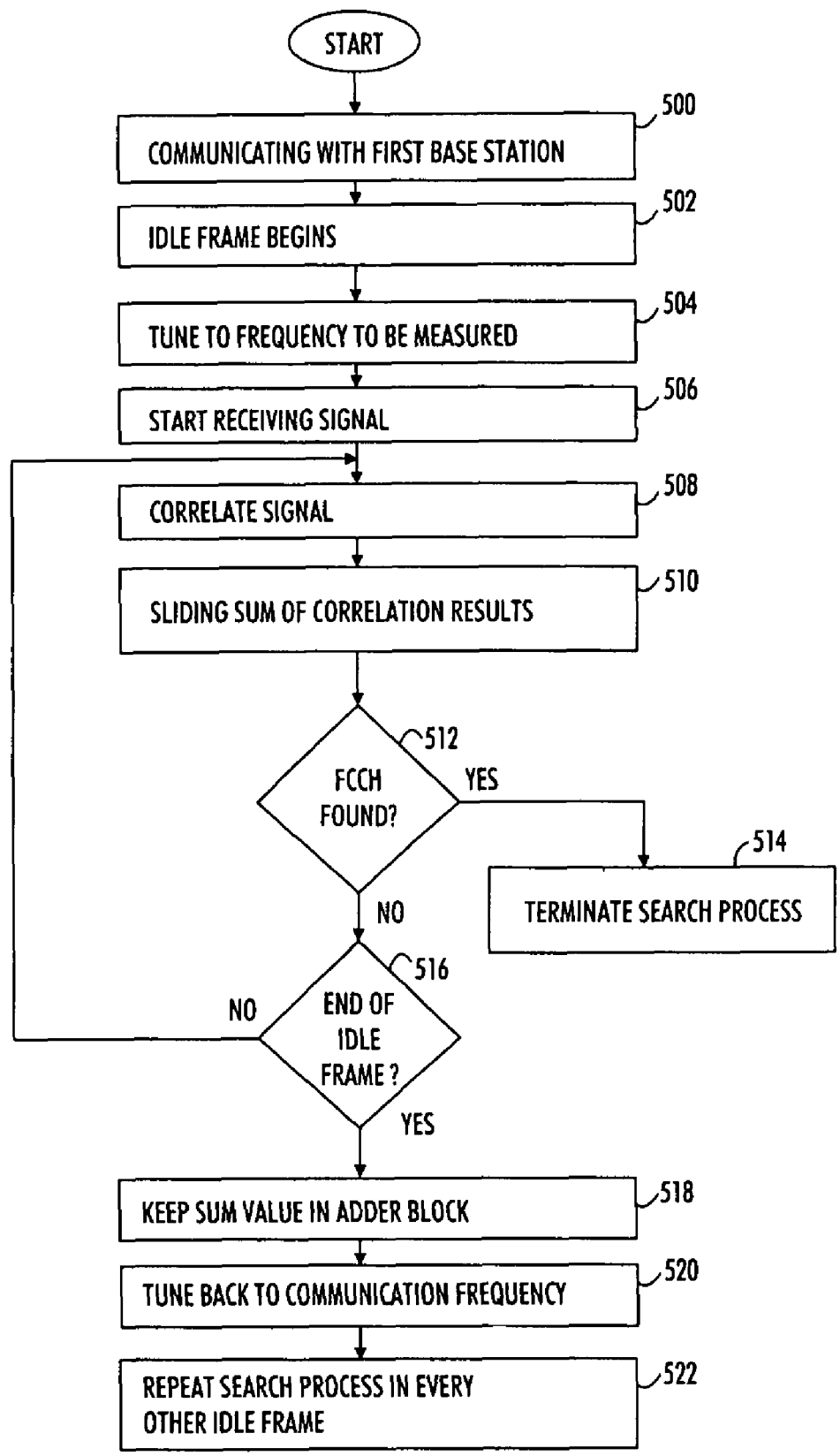
FIG. 5 is a flowchart illustrating an embodiment of FCCH measurement.

FIG. 4 and the flowchart of FIG. 5 illustrate an embodiment of the FCCH measurement. FIG. 4 shows sections of three consecutive traffic multiframes 400, 402, 404 of FIG. 2. The three consecutive multiframes comprise three idle frames 406, 408 and 410. From the end of the idle frame 406 there are 51 frames to the beginning of the idle frame 410.

In step 500, user equipment is communicating with a base station at a given frequency using one or more allocated time slots in frames of the multiframe 400. If the connection is a multislot connection, the number of allocated time slots may be 6 or 7, for example.

In step 502, the last time slot allocated to the connection of the user equipment in the last frame before the idle frame 406 has elapsed. This is the frame T24 of multiframe 400. There might be few free time slots left in the frame T24 before the frame ends. In a high multislot connection there may be only one free time slot left.

In step 504, the user equipment tunes to the frequency to be measured.

In step 506, the user equipment starts receiving a frame format signal transmitted at the measured frequency by a second base station.

In step 508, the user equipment correlates the received signal with a reference signal. The reference signal may be an ideal FCCH signal. The format of the FCCH signal is known to the user equipment. The calculation of correlation may comprise normalization of the correlation result with the inverse of the total power of the received signal. Typically, the correlation is performed in blocks of short duration. The length of a block may be few symbols, such as 8 symbols. The length of the block may vary depending on the user equipment.

In step 510, the user equipment sums the correlation results over a given time period in an adder block. The summing is performed as a sliding sum. Thus, as the correlation results of the latest block are added, the oldest correlation results are dropped from the sum. In an embodiment, the length of the summing period equals approximately the length of an FCCH time slot.

In step 512, the user equipment compares the calculated sum with a given reference value. The reference value may be a system parameter or it may depend upon the implementation of the equipment.

If the sum exceeds the reference value, the user equipment makes the decision that the frequency correction channel FCCH has been detected. In such a case, the user equipment stores the position of the frequency correction channel in the received frame format signal and terminates the process in step 514.

If an FCCH is not found, the user equipment checks in step 516 whether the idle frame 406 has terminated. If this is not the case, the process continues in step 508. The correlation and comparison process continues until the idle frame 406 ends or an FCCH has been found.

If the idle frame has terminated, the user equipment keeps the value in the adder block in step 518, In step 520, the user equipment tunes back to the frequency used by the first base station; and starts communicating with the first base station in multiframe 402.

In step 522, the above process is continued in every other idle frame. As from the end of the idle frame 406 there are 51 frames to the beginning of the idle frame 410, the user equipment may continue measuring the frequency at which FCCH is sent in frame 410 from the same frame position the search closed in frame 406.

In an embodiment of the invention, the search is not terminated immediately when a sum value exceeding the reference value is found. Instead, the search is continued to check if there are better values to be found. The present highest sum value and the respective frame position may be kept in memory.

Figure 6:
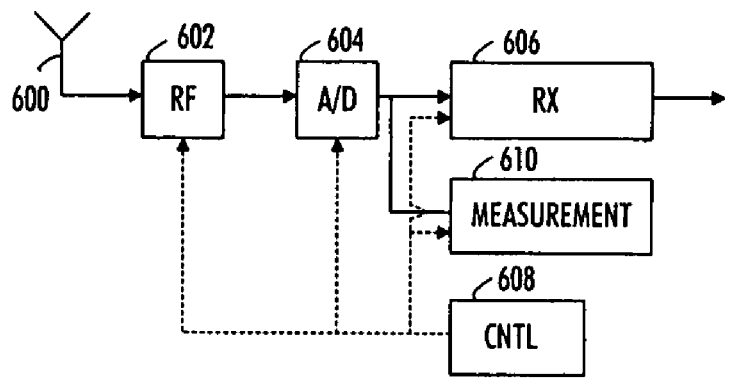
FIG. 6 illustrates an example of the structure of user equipment.

FIG. 6 illustrates an example of the structure of user equipment. The user equipment comprises an antenna 600, and radio frequency unit 602 operatively connected to the antenna. The radio frequency unit receives a radio frequency signal using the antenna and amplifies and filters the signal. The signal may be transformed into intermediate or base band frequency. The signal is taken to a sampler or an A/D converter 604 which takes samples of the received signal. The signal is further taken to a receiver 606 configured to communicate in one or more allocated time slots with a base station.

The user equipment further comprises a controller 608 configured to control the operation of the user equipment.

The user equipment further comprises a measurement apparatus 610 operatively connected to the sampler 604. The apparatus 610 is configured to perform FCCH search by correlating the received signal under the control of the controller as described above.

In an embodiment, the controller controls the radio frequency unit to tune to the frequency to be measured and connects the received signal to the apparatus 610. When the idle frame ends, the controller controls the radio frequency unit to tune to the frequency used when communicating with the first base station and connects the received signal to the receiver 606.

Figure 7A:
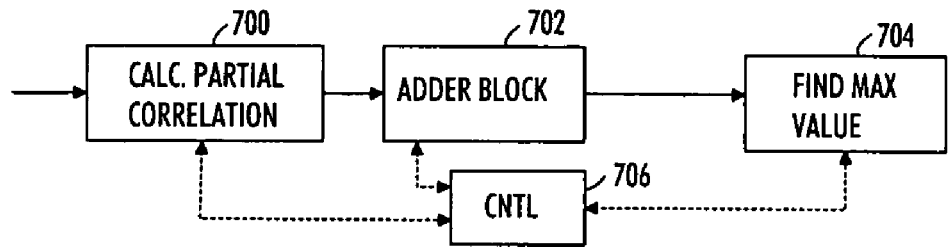
FIGS. 7A and 7B illustrate examples of an FCCH measurement apparatus.

FIG. 7A illustrates an example of the structure of the apparatus 610. The apparatus comprises a correlator 700. The correlator has as an input the signal from the sampler, i.e. samples of a received signal. The correlator is configured to correlate samples with a reference signal.

The apparatus comprises an adder block 702 operatively connected to the output of the correlator. The adder block 702 is configured to sum the correlation results over a given time period as a sliding sum.

The apparatus further comprises a comparator 704 operatively connected to the output of the adder block 702. The correlator 704 is configured to compare the sum with a given reference value.

The apparatus further comprises a controller 706 configured, if the sum in the comparator 704 exceeds the reference value, to make the decision that a frequency correction channel has been detected, store the position of the frequency correction channel and cease the correlation process;

and otherwise configured to control the correlation and comparison to continue until the time reserved for the correlation process ends, to retain the value in the adder block 702; and to control the apparatus to resume the above process when a new time reserved for the correlation process is due.

The controller 706 may be the same controller 608 as in FIG. 6 or the controller 608 may control it.

Controllers 608 and 706 may be realized with digital signal processors and associated software. The apparatus 610 as a whole may be realized with one or more digital signal processors or discrete circuits and associated software.

Figure 7B:
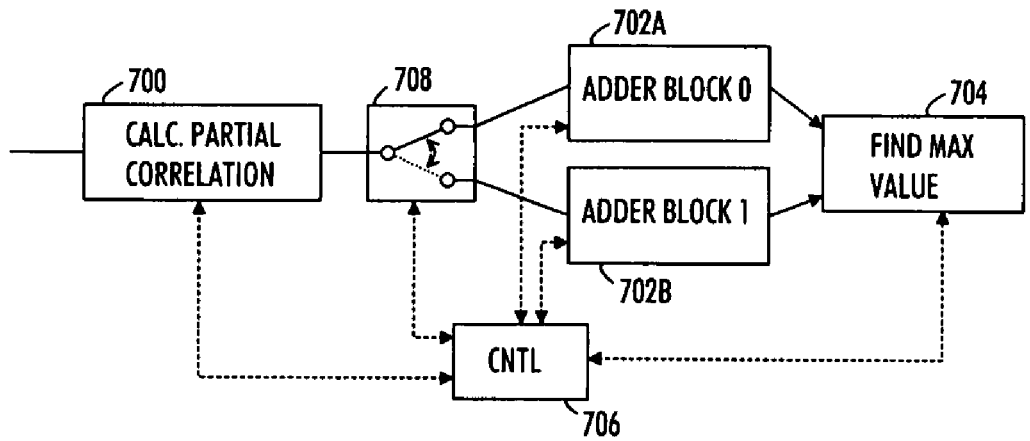

In the above example, the idle frame 408 is skipped. FIG. 7B illustrates the structure of the apparatus 610 which may utilize the idle frames as alternating pairs.

The apparatus comprises a correlator 700. The correlator has as an input the signal from the sampler, i.e. samples of a received signal. The correlator is configured to correlate samples with a reference signal.

The apparatus of FIG. 7B comprises two adder blocks 702A and 702B. The apparatus comprises a switching unit 708 configured to switch the output of the correlator 700 to either one of the two adder blocks.

As in the example of FIG. 7A, the adder blocks 702A and 702B are configured to sum the correlation results over a given time period as a sliding sum.

The apparatus further comprises a comparator 704 operatively connected to the output of the adder blocks 702A, 702B. The correlator 704 is configured to compare the sum with a given reference value.

The apparatus further comprises a controller 706. The controller is configured to control the switch 708 and, if the sum in the comparator 704 exceeds the reference value, to make the decision that a frequency correction channel has been detected, store the position of the frequency correction channel and cease the correlation process;

and otherwise configured to control the correlation and comparison to continue until the time reserved for the correlation process ends, to retain the value in the adder blocks 702A, 702B and to control the apparatus to resume the above process when a new time reserved for the correlation process is due.

The controller 706 controls the switching unit 708 to switch the output of the correlator 700 to either one of the two adder blocks 702A, 702B.

Assuming that the FCCH search started in a frame n, the adder block 702A is used for partial results calculated from frames n+p*52, and the adder block 702B is used for results calculated from frames n+26+p*52, where p is an integer starting from 0. It can be shown that 13 idle frames are needed to cover all possible locations of FCCH timeslot.

Assume that the adder block 702A is filled first. For the adder block 702A, p needs to run from 0 to 6, and for the adder block 702B, p needs to run from 0 to 5. Correlation sums are calculated as sliding sums. Thus, both adder blocks reset only when search is started at a new frequency. The adder blocks are not reset between the idle frames. During the search, the oldest partial results are left out so that the correlation sum is always calculated over a period which is approximately equal to the length of an FCCH timeslot. In order to find the most probable FCCH position, the user equipment needs to find the highest correlation result over both correlation blocks.

Referring to FIG. 4, the adder block 702A uses idle frames 406 and 410 and so on. Respectively, the adder block 702B uses the idle frame 408 and the idle frame following the idle frame 410 and so on.

In this embodiment, the search will be performed twice as fast compared to the previous embodiment as every idle frame is utilized and the multiframe structure of the frequency to be measured is searched in two sections.

When the search which was ongoing in frame n continues in a new idle frame n+52, the user equipment needs to combine results from frames n and n+52 non-coherently. Thus, any phase shift between the frames needs to be compensated for. However, this can be done easily by calculating correlation values over short blocks, and then summing them over longer periods. The correlation process removes any phase shift.

The measurement scheduling described above is faster compared to prior art solutions as the search may be continued immediately. The data stored in an adder block or blocks may be utilized and there is no need to wait for the blocks to fill with new data.

An example of measurement scheduling: First, 0.5 time slots is required for switching from the current TX/RX frequency to the frequency where FCCH search is performed. 8 time slots are spent for searching the FCCH. The search continues from the same place in the signaling frame structure where the search closed in the next to the last idle frame. Finally, 0.5 time slots are required for switching from the FCCH frequency to the current TX/RX frequency. Thus, the complete operation takes 9 time slots, which are available even when the mobile unit is having a high multislot connection.

The embodiments of the invention may be realized in an electronic device, comprising an RF unit, an A/D converter, and a digital signal processor or an equivalent processor apparatus. The processor may be configured to perform at least some of the steps described in connection with the flowchart of FIG. 5 and in connection with FIGS. 2, 3, 4, 6, 7A and 7B. The embodiments may be implemented as a computer program comprising instructions for executing a computer process for detecting a frequency correction channel, the process comprising: communicating in one or more allocated time slots at a given frequency with a first base station, the first base station transmitting a frame format signal comprising idle frames; tuning to a frequency at which a second base station with which the user equipment does not have connection is transmitting a signal, when the last allocated time slot before an idle frame is elapsed; receiving a frame format signal transmitted by the second base station; correlating the received signal with a reference signal; summing the correlation results over a given time period in an adder block; comparing the sum with a given reference value and if the sum exceeds the reference value making the decision that a frequency correction channel has been detected, storing the position of the frequency correction channel in the frame format signal and exiting the process; otherwise; continuing correlation and comparison until the idle frame ends; retaining the value in the adder block; tuning back to the frequency used by the first base station; and continuing the above process in every other idle frame.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, and computer readable printed matter.

Even though the invention has been described above with reference to an example according to the accompanying drawings, it is clear that the invention is not restricted thereto but it can be modified in several ways within the scope of the appended claims.

The invention claimed is:

1. A method in user equipment, comprising:
communicating in one or more allocated time slots at a given frequency with a first base station;
searching for a frequency correction channel in a signal received from a second base station using two adder blocks, one for each alternate idle frame pair;
tuning to a frequency at which the second base station with which the user equipment does not have connection is transmitting the signal, when a last allocated time slot before an idle frame has elapsed;
receiving a frame format signal transmitted by the second base station;
correlating the received signal with a reference signal;
summing correlation results over a given time period in an adder block of the two adder blocks as a summing value; and
comparing the sum with a given reference value and, if the sum exceeds the reference value, determining that the frequency correction channel has been detected, storing a position of the frequency correction channel and exiting the process, otherwise,
continuing correlation and comparison until the idle frame ends, retaining the summing value in the adder block, tuning back to the frequency used by the first base station, and continuing the above process in every other idle frame.

2. The method of claim 1, further comprising:
deleting the oldest correlation result from the adder block when a new correlation result is calculated.

3. The method of claim 1, further comprising:
calculating a correlation result for a period of m successive symbols of the frame format signal received from the second base station, where m is a positive integer; and
summing the correlation results over a given time period equaling a length of a frequency correction channel time slot.

4. The method of claim 1, further comprising:
resetting the value in the adder block when a correlation process is started for the second base station frequency.

5. The method of claim 1, further comprising:
utilizing a first adder block of the two adder blocks for correlation results calculated during idle frames p*52, and a second adder block of the two adder blocks for correlation results calculated during idle frames 26+p*52, relative to the idle frame during which the correlation calculation started at the second base station frequency and where p is an integer equal to or greater than 0.

6. A user equipment, comprising:
a receiver configured to communicate in one or more allocated time slots at a given frequency with a first base station;
two adder blocks configured to search for a frequency correction channel in a signal received from a second base station using the two adder blocks, one for each alternate idle frame pair;
a radio frequency unit configured to tune to a frequency at which the second base station with which the user equipment does not have connection is transmitting the signal, when a last allocated time slot before an idle frame has elapsed;
a sampler configured to sample a frame format signal transmitted by the second base station;
a correlator configured to correlate samples with a reference signal, wherein an adder block of the two adder blocks is configured to sum correlation results over a given time period as a summing value;
a comparator configured to compare the sum with a given reference value; and
a controller configured, if the sum exceeds the reference value,
to determine that the frequency correction channel has been detected, store a position of the frequency correction channel and cease the correlation process
and otherwise configured to control the correlation and comparison to continue until the idle frame ends, to retain the summing value in the adder block; to control the radio frequency unit to tune back to the frequency used by the first base station, and to control the user equipment to continue the above process in every other idle frame.

7. The user equipment of claim 6, further comprising:
the controller configured to delete the oldest correlation result from the adder block when a new correlation result is calculated.

8. The user equipment of claim 6, wherein a first adder block of the two adder blocks is configured to sum correlation results calculated during idle frames p*52, and a second adder block of the two adder blocks is configured to sum correlation results calculated during idle frames 26+p*52, relative to the idle frame during which the correlation calculation started at the second base station frequency and where p is an integer equal to or greater than 0.

9. An apparatus, comprising:
two adder blocks configured to search for a frequency correction channel in a sample of a frame format signal using the two adder blocks, one for each alternate idle frame pair;
a correlator configured to correlate samples of the frame format signal with a reference signal, wherein an adder block of the two adder blocks is configured to sum correlation results over a given time period as a summing value;
a comparator configured to compare the sum with a given reference value; and
a controller configured, if the sum exceeds the reference value,
to determine that the frequency correction channel has been detected, store a position of the frequency correction channel and cease the correlation process,
and otherwise configured to control the correlation and comparison to continue until a time reserved for the correlation process ends, to retain the summing value in the adder block, and to control the apparatus to resume the above process when a new time reserved for the correlation process is due.

10. A method, comprising:
receiving a sampled frame format signal;
searching for a frequency correction channel in the sampled frame format signal using two adder blocks, one for each alternate idle frame pair;
correlating the sampled signal with a reference signal;
summing correlation results over a given time period in an adder block of the two adder blocks as a summing value; and
comparing the sum with a given reference value and, if the sum exceeds the reference value, determining that the frequency correction channel has been detected and storing a position of the frequency correction channel and exiting the process, otherwise,
continuing correlation and comparison until the time reserved for the correlation process ends, retaining the summing value in the adder block, and continuing the above process when a new time reserved for the correlation process is due.

11. A user equipment, comprising:
communicating means for communicating in one or more allocated time slots at a given frequency with a first base station;
two adder block means for searching for a frequency correction channel in a signal received from a second base station using the two adder block means, one for each alternate idle frame pair;
tuning means for tuning to a frequency at which the second base station with which the user equipment does not have connection is transmitting the signal, when the last allocated time slot before an idle frame has elapsed;
sampling means for sampling a frame format signal transmitted by the second base station;
correlating means for correlating samples with a reference signal, wherein adder blocks means of the two adder blocks means sum correlation results over a given time period as a summing value;
comparing means for comparing the sum with a given reference value; and
controlling means for, if the sum exceeds the reference value,
determining that the frequency correction channel has been detected, storing a position of the frequency correction channel and ceasing the correlation process,
and otherwise for controlling the correlation and comparison to continue until the idle frame ends, retaining the summing value in the adder block, for controlling the radio frequency unit to tune back to the frequency used by the first base station, and controlling the user equipment to continue the above process in every other idle frame.

12. A non-transitory computer readable medium embodied a computer program, the computer program comprising instructions for executing a computer process for detecting a frequency correction channel, the process comprising:
communicating in one or more allocated time slots at a given frequency with a first base station;
searching for a frequency correction channel in a signal received from a second base station using two adder blocks, one for each alternate idle frame pair;
tuning to a frequency at which the second base station with which the user equipment does not have connection is transmitting the signal, when the last allocated time slot before an idle frame has elapsed;
receiving a frame format signal transmitted by the second base station;
correlating the received signal with a reference signal;
summing correlation results over a given time period in an adder block of the two adder blocks as a summing value; and
comparing the sum with a given reference value and, if the sum exceeds the reference value, determining that the frequency correction channel has been detected, storing a position of the frequency correction channel and exiting the process, otherwise,
continuing correlation and comparison until the idle frame ends, retaining the summing value in the adder block, tuning back to the frequency used by the first base station, and continuing the above process in every other idle frame.

13. The non-transitory computer readable medium of claim 12, wherein the computer readable medium comprises at least one of the following media: a program storage medium, a record medium, and a computer readable memory.

* * * * *